March 25, 1924.  
E. HOPKINSON  
MANUFACTURE OF WEFTLESS FABRIC  
Filed Dec. 14, 1922  2 Sheets-Sheet 1  
1,488,048
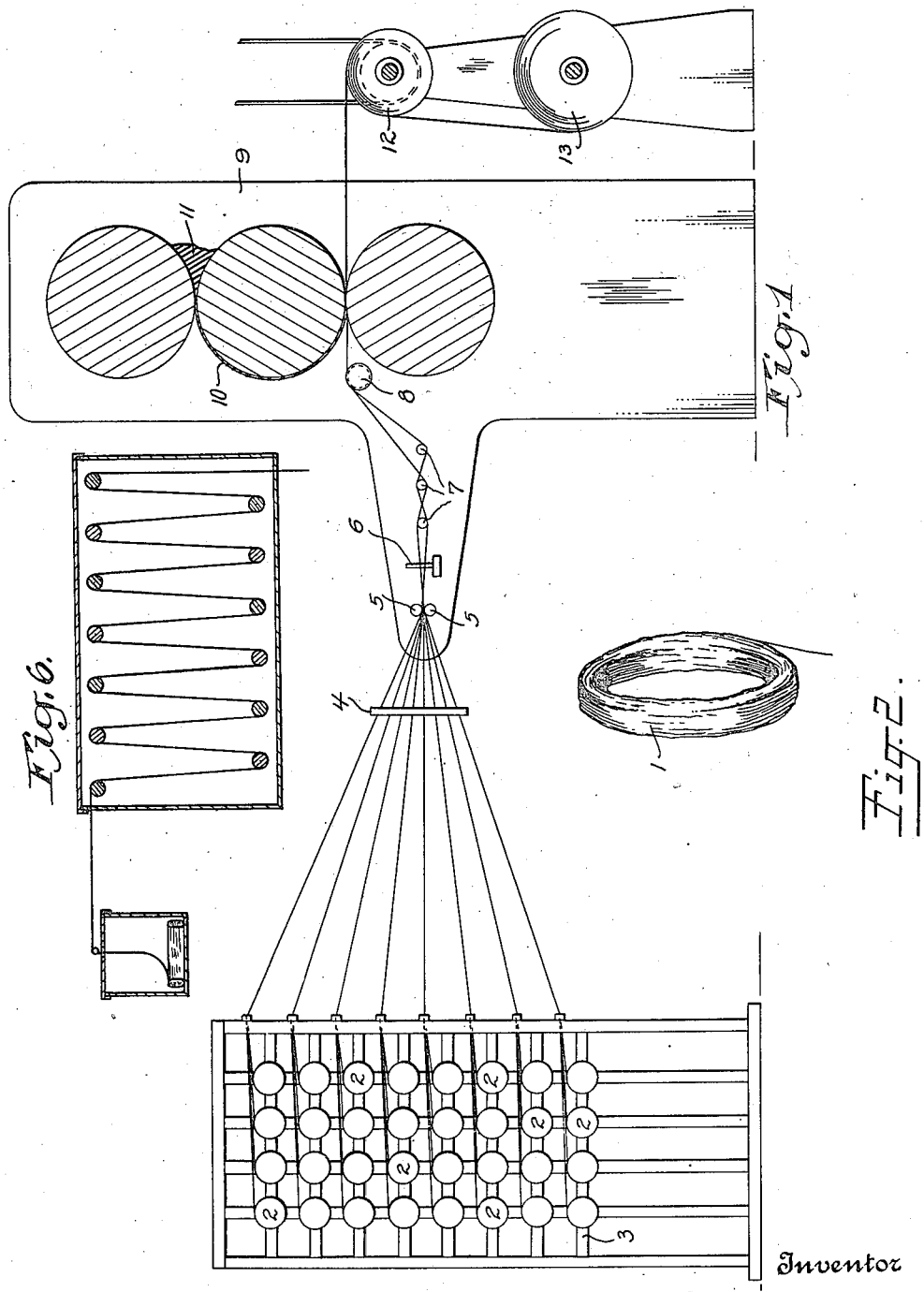

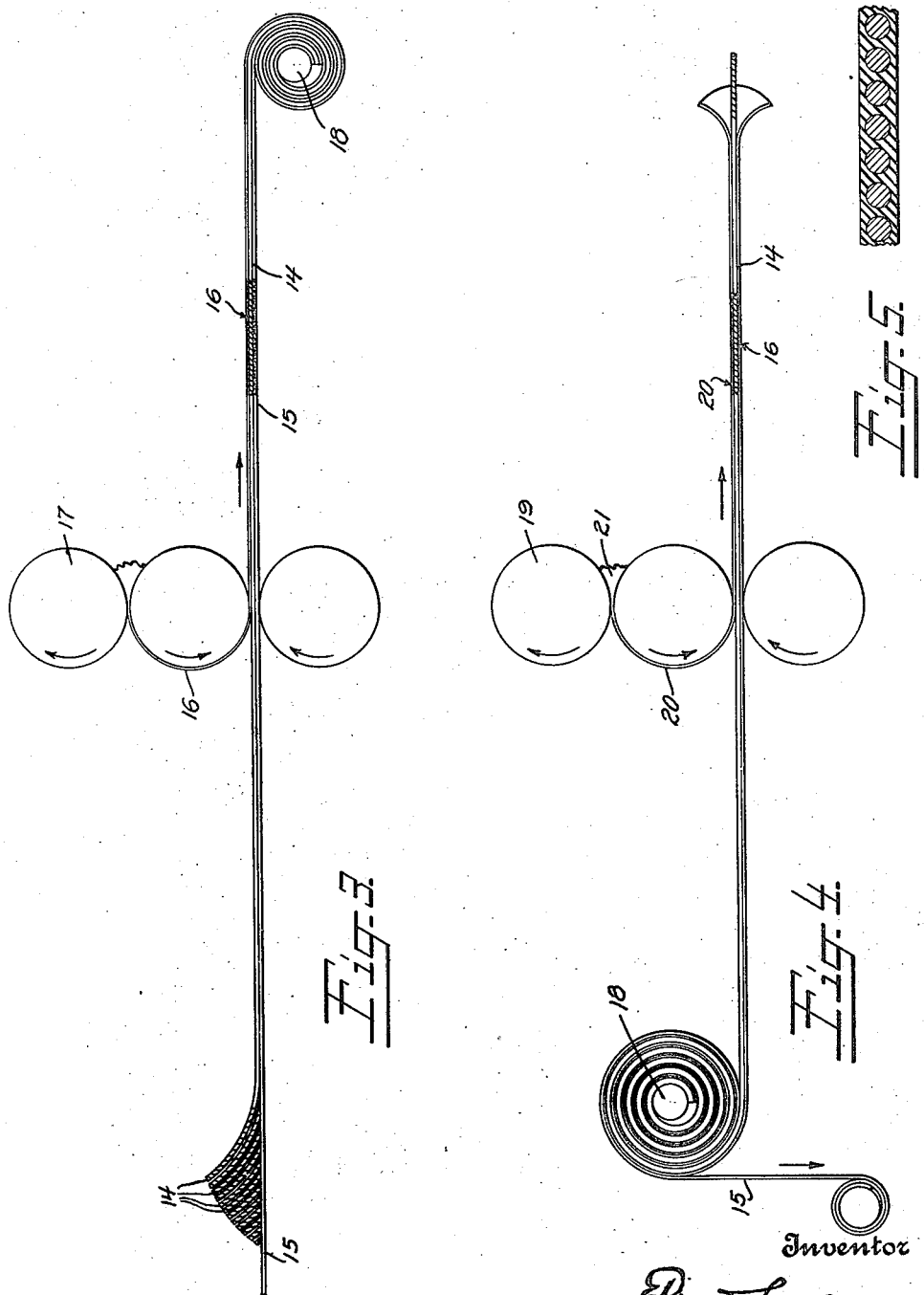

Patented Mar. 25, 1924.

1,488,048

UNITED STATES PATENT OFFICE.

ERNEST HOPKINSON, OF NEW YORK, N. Y.

MANUFACTURE OF WEFTLESS FABRIC.

Application filed December 14, 1922. Serial No. 606,768.

*To all whom it may concern:*

Be it known that I, ERNEST HOPKINSON, a citizen of the United States, residing at New York city, county of New York, and State of New York, have invented certain new and useful Improvements in the Manufacture of Weftless Fabric, of which the following is a full, clear, and exact description.

This invention relates to the manufacture of material for incorporation in rubber articles, and particularly weftless fabric suitable for cutting up into plies for pneumatic tire casings.

It has been found advantageous to utilize latex-treated sheets of cords for making rubber articles in general and in particular tire casings. The present invention contemplates latex treatment and drying of the cords unjoined by webs of rubber, and their maintenance in sheet formation by the subsequent application of a film of rubber composition, resembling a "skim coat" in the old processes.

With the illustrated embodiment in mind and without intention to limit more than is required by the prior art, the invention, briefly stated, consists in treating the cords with latex, drying them, arranging the cords in parallel relation, and then, passing them while maintaining the cords parallel, through a calender which continuously applies a film of vulcanizable rubber composition to join and hold the cords in sheet formation.

An embodiment of the invention is illustrated in the accompanying drawings, in which:

Fig. 1 is an elevation, partly in section, of apparatus suitable for practicing my invention;

Fig. 2 is a perspective of a skein of loosely coiled cord after it has been treated with latex and dried;

Figs. 3 and 4 illustrate diagrammatically calenders for continuously filming rubber composition and applying it to the cords, first to one side and then the other, the cords in Fig. 3 having been previously dried on a backing which is passed through the calender therewith;

Fig. 5 is an enlarged cross-section of the finished product in its preferred form, coated on both sides with rubber composition which unites the cords to one another.

And Fig. 6 illustrates diagrammatically the method of treating the cords with latex and drying the cords after such treatment.

According to the invention, great lengths of cords in any suitable loose formation, such as the skeins 1 illustrated in Fig. 2, are treated with latex, more or less concentrated, and with or without admixed preserving, vulcanizing or accelerating agents. This treatment may be done by dipping in a vat filled with latex, or in any other suitable manner.

The dipped cords are next dried either in the coiled form shown in Figure 2 of the drawings, or festooned in a drying chamber as shown in Figure 6 of the drawings, or otherwise as desired. Then, the cords, preferably, are wound on the supports 2, such as the spools conventionally illustrated, in any formation readily unwound, of which there are many in common use in the textile industries. A number of the supports, or spools, 2, are then suitably arranged on a creel 3 and the individual cords conducted therefrom through a thread-board 4, to a pair of guide-rods 5, thence through a comb 6, release rods 7, and over a roll 8, to a calender 9. The roll 8 is preferably provided with grooves in number equal to the number of cords in the fabric. By this means, the cords are constrained against lateral shifting, and equi-distant spacing thereof is insured immediately before the application of a film of rubber 10, which is continuously formed from a bank 11. This film 10 applied, holds, or binds, the cords collectively in sheet formation. As fast as the material is formed, it is removed by a suitably operated wind-up reel 12, along with a liner strip 13, which is interposed between its convolutions.

The film of rubber 10 is formed continuously, as well known, by maintaining a bank of vulcanizable rubber composition 11, of any suitable composition and calenderable between the upper pair of rolls, stock being supplied from time to time to maintain the bank 11.

Advantages of the present invention are that the cords may be individually impregnated thoroughly and immediately after they have been twisted together from fibrous strands, thereby fixing their constituents in the position and condition originally made; that the latex-treated and dried cords are rendered substantially hydroscopic, and in that particular, at least, especially suited for transport and storage immune from the weather; and that the manufacturer, of tires, for instance, may finish his ply stock, on one face at least, by a single calendering operation instead of, as heretofore, by two, or even three, passes through "frictioning" and "skim-coating" calenders. Other advantages will be apparent to those versed in the art and need no special mention here.

Within the broad aspects of the invention, it is immaterial in what formation, or relation, the cords are treated with latex and dried, the essential thing being to produce separate and independent cords impregnated and surfaced with virgin rubber, and then to unite them together with rubber composition so as to form a sheet that can be cut up into manipulatable plies, for tires, etc., or handled in long lengths, if necessary. And while skein dipping and drying have the advantages enumerated above, the invention may also be practiced by first superimposing latex-treated cords 14, Fig. 3, on a backing 15, and drying them without substantial webs, or tissues, joining the cords to each other and thereafter uniting the cords to form a sheet by calendering, or otherwise applying, a film of rubber composition 16, onto and between them, the backing on which the cords have been dried preventing them from shifting laterally, or spreading irregularly, under the pressure developed by the calender roll 17. To prevent the formation of webs of rubber between the cords, it is advantageous to at least partially dry the latex on the cords before they are applied to the "backing," but mechanical means, such as a series of blades between the cords, may be utilized to break down the webs of latex or hold the cords against irregular grouping in pairs or multiples.

The material after leaving the calender is reeled up, as indicated at 18, ready either for cutting up into plies, if the article only requires them to have a skim coat on one surface, or ready for a subsequent skim coating on its reverse side. The latter may be done, as indicated in Fig. 4, by stripping the backing 15 from the laminated sheet as it uncoils from the roll 18, which has been transferred to a position in front of a second calender 19. The cords 14, united by the rubber composition 16, are led through the second calender 19, with that face of the cords which had been engaged by the backing exposed for continuous application under pressure thereto of a second coat of vulcanizable rubber composition 20, which is continuously filmed, as indicated, from a bank 21 of stock maintained between the bight of the upper pair of calender rolls. Of course, the second surface, or skim, coat may be applied successively without an intermediate reeling up operation by employing special types of calenders shown in prior patents, but the illustrated arrangement is practical and suffices to disclose the principle of the invention.

This method of drying the latex-treated cords in spaced relation on a backing is of particular advantage when the tires, or other articles, are to be made of plies of rubberized stress-resisting-elements spaced apart and completely separated every one from its neighbor. The latex-treated cords in a more or less wet condition may be variously applied to the backing and dried thereon, or adhered thereto, without, however, any rubber webs connecting the cords together. Desirably, in disconnected relation, they are dried fast to a backing (which is preferably a woven fabric, such as a liner) to permit rubber composition being pressed on and crowded down between the cords without disturbing the spaced apart relation in which they were initially secured to the backing. Of course, the coat (or coats, if more than one is desired) on one face of the cords serves the same purpose as the backing when the latter is removed, or stripped, to permit applying composition onto the other face of the cords.

In Fig. 5 of the drawings is illustrated the product in its preferred form with the latex-treated and dried cords spaced apart and completely surrounded by rubber composition, in this figure, the product being shown as it would appear in cross-section after coating both of its faces which is more desirable for manufacturing purposes. It will be understood, of course, that if only one surface is coated with rubber composition, the latter will crowd down between and around the cords so that the latter will lie substantially tangent to the opposite surface, but will be, however, practically completely enveloped by rubber composition. In this case, the surface coat that is applied to the next ply is relied upon to insure isolation of the cords in contiguous plies or layers. It is also to be understood that the same side of the cords may be coated more than once by successive applications of rubber, or rubber composition, if desired.

The species of the invention in which the cords are supported on a liner while webbed or permanently united together with vulcanizable rubber composition constitutes the more limited subject matter of another application, Serial No. 657,849, filed August 17th, 1923.

It will be obvious that many changes may be made in the above described methods without departing from the principles underlying my invention, and reference is therefore made to the appended claims for an understanding of its scope.

Having thus described my invention, what

I claim and desire to protect by Letters Patent is:—

1. That method of manufacturing weftless fabric which consists in, treating with latex and drying a plurality of cords, assembling the cords in independent disconnected parallel relation, and finally joining the cords with vulcanizable rubber composition to form a sheet thereof.

2. That method of manufacturing weftless fabric which consists in, treating with latex and drying a plurality of independent cords to impregnate them with rubber without connecting them together therewith, continuously advancing the cords in parallel relation, and continuously pressing rubber composition onto and between the parallel cords so as to unite them together to form a sheet.

3. That method of manufacturing weftless fabric which consists in, latex treating and drying a plurality of cords and arranging them parallel in spaced-apart relation unconnected by intervening webs of rubber, continuously advancing the cords thus arranged, and continuously joining the cords together with vulcanizable rubber composition to form a sheet thereof.

4. That method of manufacturing weftless fabric which consists in, treating penetrable masses of cords with latex, drying the latex-treated masses to load the individual cords with latex, continuously assembling the cords in parallel sheet formation, feeding the parallel cords continuously to a machine for filming vulcanizable rubber composition, and continuously applying the film of composition to the sheet of cords to join them together and form the sheet.

5. That method of manufacturing weftless fabric which consists in, coiling relatively long lengths of cords into skeins, immersing the skeins in latex, drying the treated skeins, winding the skeins on supports in formations readily unwound, continuously assembling the cords in contiguous parallel sheet formation, and calendering vulcanizable rubber composition thereonto to join together the cords.

6. That method of manufacturing weftless fabric which consists in, forming a plurality of cords impregnated and surfaced with latex, assembling the cords in spaced parallel relation, and finally uniting the cords with a coat of vulcanizable rubber composition to form a sheet thereof.

7. That method of manufacturing weftless fabric which consists in, treating with latex and drying a plurality of cords to impregnate them with rubber without connecting webs therebetween, conducting the cords to a calender and restraining them against lateral shift, and calendering vulcanizable rubber composition onto the cords while so restrained thereby to join the cords together and form a sheet thereof.

Signed at New York city, county of New York, and State of New York, this 12th day of December, 1922.

ERNEST HOPKINSON.